United States Patent [19]

Greenberg

[11] 3,931,591
[45] Jan. 6, 1976

[54] Q-SWITCHING DEVICE FOR GLASS LASERS

[75] Inventor: Charles B. Greenberg, Murrysville, Pa.

[73] Assignee: PPG Industries, Inc., Pittsburgh, Pa.

[22] Filed: Jan. 17, 1974

[21] Appl. No.: 434,156

Related U.S. Application Data

[60] Division of Ser. No. 65,894, Aug. 21, 1970, Pat. No. 3,865,747, which is a continuation-in-part of Ser. No. 673,614, Oct. 9, 1967, abandoned.

[52] U.S. Cl.............. 331/94.5 E; 106/47; 106/52; 106/53; 106/54; 252/301.1 L; 350/160 P
[51] Int. Cl.² .... C03C 3/04; C03C 3/10; H01S 3/10
[58] Field of Search............ 331/94.5; 252/301.1 L; 106/50, 52, 53, 54, 47

[56] References Cited
UNITED STATES PATENTS

| | | | |
|---|---|---|---|
| 3,365,678 | 1/1968 | Maurer | 331/94.5 Q |
| 3,471,408 | 10/1969 | Young | 106/52 X |
| 3,473,144 | 10/1969 | Shiner | 331/94.5 Q |

OTHER PUBLICATIONS

Melamed et al., Laser Action in Uranyl-Sensitized Nd-Doped Glass, Appl. Phys. Letters, Vol. 6, No. 3 (Feb. 1, 1965), pp. 43–45.
Gandy et al., Laser Oscillations and Self Q-Switching in Triply Activated Glass, Appl. Phys. Letters, Vol. 7, No. 9 (Nov. 1, 1965), pp. 233–236.
Weyl, W. A. – Coloured Glasses – Pub. by Dawson's of Pall Mall, London (1959), p. 5, p. 211, pp. 229–230.

Primary Examiner—Helen M. McCarthy
Attorney, Agent, or Firm—Dennis G. Millman; William J. Uhl

[57] ABSTRACT

An improved Q-switched neodymium laser in which uranium as $UO_2^{+2}$ and a uranium oxidizing agent such as cerium in a host body such as glass serve as either an external or an internal Q-switching device for the laser.

1 Claim, 1 Drawing Figure

U.S. Patent   Jan. 6, 1976   3,931,591
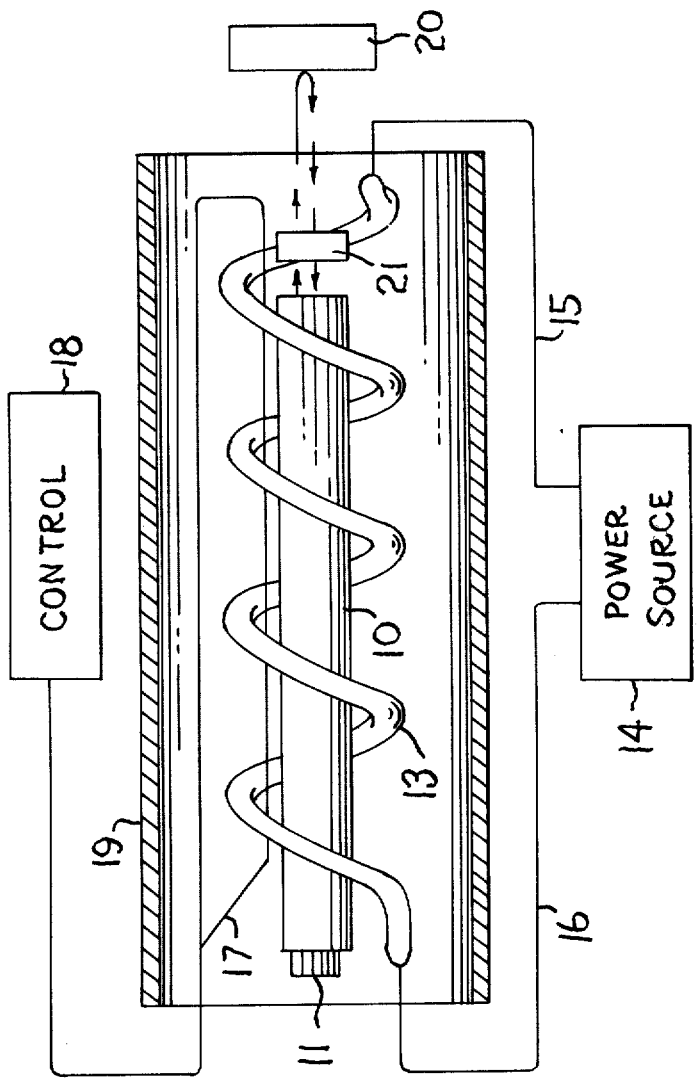

3,931,591

Q-SWITCHING DEVICE FOR GLASS LASERS

CROSS REFERENCE TO RELATED APPLICATIONS

This application has been filed pursuant to a requirement for restriction in parent application Ser. No. 65,894, filed Aug. 21, 1970, now U.S. Pat. No. 3,865,747 which is a continuation-in-part of application Ser. No. 673,614, filed October 9, 1967, now abandoned. The present application claims priority from said earlier filed applications under 35 U.S.C. 120 as well as the benefits of 35 U.S.C. 121.

The present invention relates to lasers and it has particular relation to a Q-switching device for glass lasers.

A laser, by definition, is a device that amplifies light by stimulated emission of radiation and is specifically adapted to produce high-intensity, coherent, monochromatic light in a narrow beam. Light, in this definition, is not limited to radiation in the visible region of the spectrum. Lasers in the form of glass or crystalline rods are well known. In such form the glass or crystal acts as a host for an element which radiates energy at particular wavelengths at a greatly amplified level (above and beyond that of fluorescence) due to the manner in which a laser acts.

The action of a glass laser is described in several publications. These include a book entitled *Introduction to Laser Physics* written by Bela A. Lengyel and published in 1966 by John Wiley and Sons, Inc. of New York, New York — Library of Congress, Catalog Card No. 65-27659, and an article entitled "Glass Lasers" by Dr. E. Snitzer starting at page 1487, Volume 5, No. 10, *Applied Optics*, October 1966.

A number of elements have been found to lase in glass. These include $Nd^{+3}, Yb^{+3}, Er^{+3}$ and $Ho^{+3}$. Neodymium is the most important of these because it can be operated at room temperature as a four-level laser. A number of glass and crystal compositions have been developed to act as hosts or lasing elements, particularly neodymium. These compositions are set forth in the above references as well as in the following patents:

| | |
|---|---|
| U.S. 3,225,306 | ($CaWO_4$) |
| U.S. 3,250,721 | (Phosphate) |
| U.S. 3,252,103 | ($Y_3Al_5O_{12}$) |
| U.S. 3,254,031 | (Borate) |
| U.S. 3,257,625 | (Molybdate) |
| U.S. 3,258,715 | ($CaF_2$) |
| U.S. 3,220,290 | (Lime-soda-silica) |
| British 1,015,057 | (Barium Crown) |

For purposes of understanding the present invention, a brief description of laser action is provided. A more detailed explanation is set forth in the book and article mentioned above.

Light is produced in a laser by photonic emission from the active atoms of a body composed of a so-called laser material. This emission occurs incident to the transition of the atoms from an excited, high energy level to a lower energy level. Accordingly, laser operation essentially involves exciting active atoms in the laser body to a high energy level, and inducing the emissive transition of the excited atoms in a manner controlled to utilize the light thereby emitted to provide the desired laser output pulse. The nature and number of inter-level transitions which must be effected in a complete atomic cycle of laser operation are dependent on the properties of the particular laser material used.

One conventional form of laser structure includes a rod-shaped body composed of a suitable solid laser material, such as synthetic crystalline ruby (3-level) or neodymium glass (4-level), surrounded concentrically by a helical gaseous discharge tube (commonly called a flash tube), which is adapted to emit a pulse of light specifically including light in the wavelengths of absorption bands of the laser material. When the flash tube is actuated, the light pulse enters the transmissive laser body, pumping the body with energy of such wavelengths. This pumping excites active atoms in the laser body to shift from an initial ground level in a series of inter-level transitions, typically involving a first energy-absorptive transition to a very unstable high energy level and an immediately subsequent spontaneous and non-radiative transition from this unstable level to a somewhat more stable high energy level (intermediate in energy between the aforementioned ground and unstable levels) and from which fluorescent transition occurs. The pumping pulse provides the excitation step in laser operation creating a very large population of active atoms at the high energy, fluorescent level in the laser body. The system can lase when the population of active atoms at the fluorescent level exceeds that of the terminal level. This is population inversion.

For effecting induced light-emissive transition from this high energy level to complete the atomic cycle of laser operation, the laser body of the structure is disposed coaxially within a resonant cavity defined between opposed internally reflective cavity ends. A portion of the light emitted by the spontaneously emitting atoms passes through the resonant cavity to the ends thereof, and is thence reflected back and forth through the cavity between the reflective cavity ends, passing and repassing in multiple bidirectional reflections. This bidirectional reflected light induces other atoms at the fluorescent level to undergo emissive transition to the terminal level, producing more light which augments the bidirectionally reflected light in the cavity to induce still further emissive transitions from the fluorescent level population. In such fashion, a rising pulse of bidirectionally reflected light quickly develops within the cavity, reaching a quantitatively large value as the induced emissive transition of atoms from the fluorescent level population becomes massive. Light of high intensity is accordingly created in the form of a pulse as a result of the pumping.

To permit emission of a portion of the large bidirectionally reflected light pulse from the laser cavity, one reflective end of the cavity is made partially transmissive. The fraction of the bidirectionally reflected light escaping therethrough constitutes the laser output pulse.

In laser operation of the foregoing character, the energy-pumping pulse is of finite duration. Excitation of atoms to the fluorescent energy level occurs throughout this finite pumping period. However, with a laser cavity maintained internally reflective at both ends, light emitted by spontaneous emission from atoms in the fluorescent level population begins to reflect back and forth in the cavity and in so doing induces emissive transitions of other fluorescent level atoms in significant number and initiates the laser output pulse substantially before the end of the pumping period. During the pumping period, the effect of the pumping pulse in augmenting the fluorescent level population is offset by the depletion of the latter population due to lasing transitions and fluorescence. The net result is that the number of atoms at the fluorescent level diminishes instead of continuing to increase to an even greater population inversion as would otherwise be possible in the absence of induced emission and fluorescence.

It can therefore be seen that the same pumping pulse could create a significantly larger maximum fluorescent level population in the laser body if the transition-inducing state created by multiple light reflections could be retarded until a later time in the pumping period. Such delay of the latter state would be desirable, because the magnitude of the peak power attained by the laser output pulse is directly related to the magnitude of this maximum fluorescent level population, and it is often regarded as very desirable to obtain as large a peak power output as possible for optimum laser utility. In other words, the prevention of premature bidirectional light reflections, thereby allowing development of a larger fluorescent level population, would enable attainment of a peak power output advantageously greater than that produced with the non-retarded laser operation described above.

It has been found that the multiple bidirectional reflections of spontaneously emitted light can be delayed in the desired manner by a technique hereinafter referred to as Q-switching. This technique is also sometimes referred to as Q-spoiling or giant pulse creation. The Q, or quality factor, of the laser resonant cavity is proportional to the ratio of wave energy storage to wave energy dissipation per wave cycle therein. When one end of the cavity-providing structure is nonreflective, the resultant structure is said to be in a low Q condition, because light emitted by spontaneous transition of fluorescent level atoms in the laser body cannot reflect back and forth in multiple reflections through the structure, but is instead dissipated at the nonreflective end after at most two passes through the structure. In this condition, bidirectional light reflections cannot build up to induce emissive transition of high level atoms in significant number.

The Q-switching operation involves maintaining the cavity-providing structure in a low Q condition during that portion of the pumping pulse required for the fluorescant level population to reach a high value (which is substantially larger than the population of atoms attained in the non Q-switched operation). Then, when a high population inversion is achieved, the previously nonreflective end of the cavity structure is caused to become reflective, thereby switching the structure to a so-called high Q condition. Multiple bidirectional reflection of light produced by spontaneous emission in the lasser body begins upon such switching, and quickly rises by induced emission from atoms in the very large fluorescent level population previously established. The resultant laser output pulse is much faster in rise time, and very desirably higher in peak power, than the pulse produced in the non-Q-switched laser operation.

An example of apparatus which includes a Q-switching device is shown in U.S. Pat. No. 3,281,712. In this apparatus, the Q-switching is accomplished mechanically by means of a shutter composed of a plane opaque member having a surface of minimal reflectivity and an aperture or slit. The shutter is disposed in the laser apparatus between the laser and one reflective surface so as to prevent bidirectional reflection of light therethrough except when the aperture in the shutter is in line with the light transmitted from the laser.

Another example of a Q-switching device is the use of a glass in place of the shutter described in U.S. Pat. No. 3,281,712. The glass is characterized by having the property of saturable absorption at the lasing wavelength. Q-switching can also be accomplished internally by incorporating an element in the laser glass which causes self Q-switching. This is described by N. T. Melamed, C. Hirayama and P. W. French in an article published in *Applied Physics Letters*, Volume 6, Number 3, dated Feb. 1, 1965, page 43.

The Q-switching phenomenon is generally described as a consequence of saturable absorption at the lasing wavelength by some ionic species other than the active lasing ion. The incorporation of uranium in a neodymium glass permits the neodymium glass to self Q-switch. This occurs because of excited state saturable absorption in the $UO_2^{+2}$ energy scheme. The $UO_2^{+2}$ species of uranium is of special interest because it also serves as a sensitizer (energy transfer) in $Nd^{+3}$ glasses and in $Nd^{+3}$ plus $Yb^{+3}$ glasses. The function of the uranium as a sensitizer is to absorb energy from the energizing source and transfer it to the neodymium after a suitable build-up. The neodymium is said to be sensitized by the uranium in this case.

The present invention is concerned with an improvement in a Q-switched laser employing a lasing element such as neodymium in combination with uranium. The uranium can serve as an external Q-switcher by being in a glass separate from the neodymium glass or as an internal Q-switcher by being incorporated in the neodymium glass. In accordance with the present invention, it has been found that the valence state of the uranium is critical as far as the efficiency of its sensitizing and Q-switching functions are concerned.

Uranium is present in a glass in a plurality of valence states, namely $U^{+4}$, $U^{+5}$ and $UO_2^{+2}$ (uranyl). It has been found that the ground state absorption of uranium at 1.06 microns wavelength is influenced by the valence state of the uranium. This is important since it is the radiation of neodymium at 1.06 microns which is the lasting radiation. Catastrophic ground state absorption losses at 1.06 microns wavelength occur in a uranium glass melted in the absence of a strong redox oxidizing agent. These ground state absorption losses are less as more of the uranium is present in its fully oxidized state, namely $UO_2^{+2}$.

In accordance with the present invention, a uranium glass is provided in which the proportion of the uranium which is present in the $UO_2^{+2}$ state is greatly enhanced. This is accomplished by incorporating in the glass an element which serves to establish and/or maintain the uranium during the melting of the glass in its most fully oxidized state, namely $UO_2^{+2}$. One means of accomplishing this is to include cerium in the glass in an amount which is sufficient to insure that approximately 91 percent of the uranium is in the desired valence state in the glass after melting and cooling to room temperature. The glass is annealed during cooling to serve the particular laser use according to conventional practice.

The invention in its embodiment an an external Q-switching device is shown diagrammatically in the accompanying drawing. Referring to the drawing, a cylindrically shaped laser rod 10 of neodymium-containing glass is shown. The rod has opposed, plane, parallel end faces perpendicular to its long axis. One end face of the rod 10 is silvered as indicated at 11, to make it internally reflective. The other end is substantially nonreflective.

A source of pumping light energy for the rod is provided by a helical flash tube 13 disposed to surround the rod concentrically for substantially the entire length of the rod, but in spaced relation to the rod. This flash tube functions on the gaseous discharge principle, and is specifically adapted to emit pulses of light including light in the wavelengths of the absorption bands of the laser material. It is powered from an appropriate power source 14, of conventional design and including a high-voltage source of electric current and capacitors for energy storage, which are connected through leads 15, 16 to the opposite end electrodes of the tube. Typically, such a power source for a laser system flash tube may be adapted to provide an input to the flash tube of about 1000 joules, at a voltage input of about one kilovolt.

The pulse-producing discharge in the flash tube is initiated by means of a trigger circuit 17, shown as encircling the turns of the helical flash tube in proximity thereto and powered from a suitable control instrumentality indicated at 18. The character and arrangement of these elements is such that with sufficient charge energy developed in the power source 14, an electrical pulse passed through the trigger circuit 17 by the control instrumentality 18 will cause such pulse-producing discharge in the flash tube, and thus produce an input of pumping light energy to the laser rod at a time controlled by the instrumentality 18.

The laser rod 10 and flash tube 13 are surrounded concentrically by an open-ended hollow cylindrical member 19 having a reflective inner surface, to concentrate the pumping light emitted by the flash tube on the rod 10.

An external resonator 20 is located in axially spaced relation to the rod at the end opposite from the end of the rod containing the silvered surface 11. Intermediate to the rod 10 and the resonator 20 there is located an external Q-switching device 21. The device 21 is positioned within the reflective member 19 and power source 14 in order to be excited by the energy from the power source 14. Alternatively, the device can be pumped by a separate power source (not shown) if the device is located external to the pumping source 14. The device 21 is composed of a uranium-containing glass and has plane, parallel, polished surfaces which are perpendicular to the axis of the rod. If functions as a Q-switching device in this set-up by preventing multiple reflection of the emitted photons along the axial path of the laser rod. It prevents this reflection by absorbing substantially all of the photons which would be reflected by the resonator 20. This absorption continues until the glass is saturated at the lasing wavelength. Thereafter, the photons, at 1.06 microns, pass through the glass and multiple reflections can occur, thereby permitting high energy or high power lasing.

An example of glass that can be used in accordance with the present invention as an external Q-switching device is described in the following example.

Example I

The following batch ingredients are utilized:

| Ingredient | Parts by Weight |
|---|---|
| SiO$_2$ (Kona Sand) | 352.5 |
| CaCO$_3$ | 101 |
| Na$_2$CO$_3$ | 143.8 |
| K$_2$CO$_3$ | 1.5 |
| Al$_2$O$_3$ | 24.0 |
| UO$_2$(NO$_3$)$_2$.6H$_2$O | 9.5 |
| CeO$_2$ | 2.5 |

The sand is leached in 4N HCl plus 4 percent by weight of 52 percent by weight HF to lower the Fe$_2$O$_3$ content from about 50 parts per million to about 4 to 5 parts per million based upon the weight of the sand. This treatment is carried out over a period of about one week. The other batch ingredients are chosen to minimize the iron content of the batch since iron adversely affects the ability of the laser glass to operate properly. Thus reagent grade batch materials are selected whenever possible. The batch materials are mixed and handled in iron-free containers to prevent the possibility of iron contamination.

The batch materials are heated in a platinum-rhodium (80-20) crucible in an electric furnace at 2600°F. under oxidizing atmospheric conditions. The molten glass is poured into a stainless steel mold, removed from the mold upon solidification and cooled gradually from 930°F. to room temperature over a period of about 16 hours. The glass has a calculated composition as follows:

| Ingredient | Percent by Weight |
|---|---|
| SiO$_2$ | 67.1 |
| CaO | 10.7 |
| Na$_2$O | 16.0 |
| K$_2$O | 0.2 |
| Al$_2$O$_3$ | 4.6 |
| UO$_2^{+2}$ | 0.95 |
| CeO$_2$ | 0.48 |
| | 100.03 |

The uranium is calculated as though all of it is present as UO$_2^{+2}$, however, some of the uranium is not present in this state as will be described hereinafter.

The valence states of the uranium in the glass are determined by comparing the absorption spectra of this glass and a glass produced in the same manner, but omitting cerium. The molar absorption coefficient is determined to be 32 square centimeters per mole at 0.41 micron which is the major UO$_2^{+2}$ absorption band. From this and Beers law, the concentration of uranium which is actually present as UO$_2^{+2}$ in the cerium-containing glass is 91 percent of the total uranium content. It is only 63 percent in the cerium-free analog glass.

The ground state absorption coefficient of the glass at 1.06 microns is critical when the glass is to be used as an external Q-switcher for a neodymium glass laser. In this regard, it is the absorption by reduced states of uranium such as U$^{+4}$ and U$^{+5}$ states that is important. The U$^{+5}$ absorption band which is centered at 0.92 micron wavelength has a long wavelength tail which imparts an absorption loss at 1.06 microns. Similarly U$^{+4}$ has a ground state absorption band centered at about 1 micron. The ground state absorption coefficient of the cerium-containing glass is 0.003 per centimeter and for the same glass without the cerium is 0.035 per centimeter. Thus the cerium-containing glass acts as a better "window" for permitting passage of the photons after the saturable absorption state is reached as heretofore described in this Example I.

Example II

The best mode of carrying out the invention involves an internal Q-switching device. In this mode, an increased amount of the uranium is caused to be present in its fully oxidized state ($UO_2^{+2}$) in a neodymium-containing glass by including an oxidizing agent such as cerium in the glass. The following batch ingredients are utilized:

| Ingredient | Parts by Weight |
|---|---|
| $SiO_2$ (Kona Sand) | 3500 |
| $BaCO_3$ | 1671 |
| $K_2CO_3$ | 1310 |
| $UO_2(NO_3)_2 \cdot 6H_2O$ | 57.9 |
| $CeO_2$ | 28.5 |
| $Nd_2O_3$ | 235 |

The sand is leached as described in Example I. The other batch ingredients are chosen to minimize the iron content of the batch, thus, reagent grade materials are selected. The batch materials are mixed and handled in iron-free containers to prevent the possibility of iron contamination.

The batch materials are charged over a period of time into a platinum-lined, refractory, 8-inch pot situated in an electric melting furnace having an atmospheric temperature of 2510°F. Approximately 12 pounds of batch are charged in the following amounts over the following schedule at the given temperatures.

| Time (Minutes from Start) | Temperature (°F.) | Amount (Pounds) |
|---|---|---|
| Start | 2510°F. | 6 |
| 55 | 2550°F. | 2 |
| 80 | 2550°F. | 2 |
| 125 | 2560°F. | 1 |
| 155 | 2570°F. | 1 |
| 230 | 2750°F. | — |

The batch is then stirred at 2750°F. by means of a platinum stirrer for about 3 hours, held at 2650°F. overnight for about 16 hours without stirring, and then stirred for about 4 hours at 2750°F. and for 2-½ hours while the interior temperature of the furnace is reduced gradually to 2450°F. All of the above is done while the furnace is in an oxidizing condition.

Thereafter the glass is removed from the furnace and cast as a square slab approximately 14 × 14 inches by 1-½ inches in thickness. The glass is then cooled to room temperature, reheated to 1080°F. and annealed slowly over a period of 240 hours from 1080°F. to room temperature at a rate of about 2° to 10°F. per hour.

The calculated and chemically analyzed compositions of the glass are as follows:

| Ingredient | Parts by Weight Calculated | Analyzed |
|---|---|---|
| $SiO_2$ | 58.5 | 57.94 |
| BaO | 21.7 | 21.25 |
| $K_2O$ | 14.92 | 15.14 |
| $UO_2^{+2}$ | 0.48 | 0.75 |
| $CeO_2$ | 0.48 | 0.54 |
| $Nd_2O_3$ | 3.92 | 3.56 |
| Other | — | 0.72 |
| | 100.00 | 100.00 |

The uranium is calculated as though all of it is present as $UO_2^{+2}$, however, some minor proportion of the uranium, preferably none, is not present in this state.

The glass is then ground and polished by conventional means to form laser rods measuring ¼ inch in diameter and 6 inches in length.

A glass prepared as above is compared with a glass made in the same manner, but without cerium. The static absorption loss at 1.06 microns for the cerium-containing glass is 0.003 per centimeter and for the glass without cerium is 0.0187 per centimeter. Characteristics of these self Q-switched laser glasses at several energy inputs using 85 and 99 percent confocal resonators and a rod size of ¼ inch diameter by 6 inches length, are shown in the following Table I wherein glass No. 1 is the glass containing cerium and glass No. 2 is the glass without cerium.

Table I

| Glass No. | Input Energy (Joules) | Average Pulse Width (Nanoseconds) | Average Peak Power (Megawatt) | Spiking Frequency (Kilohertz) | Threshold Energy (Joules) |
|---|---|---|---|---|---|
| 1 | 576 | 186 | 0.5 | 31 | 70.4 |
| 2 | 576 | 247 | 0.1 | 45 | 144 |
| 1 | 1089 | 119 | 1.5 | 28 | 70.4 |
| 2 | 1089 | 145 | 0.4 | 30 | 144 |

The results in Table I reveal improved giant spike operation, pulse width reduction of about 20 percent and an increase of peak power of about 300 percent to 500 percent in glass No. 1. The threshold energy input is lowered by about 50 percent in glass No. 1.

Example III

Conventional neodymium laser glasses contain $Sb_2O_3$, which serves as a fining agent and inhibits solarization. For this reason, additional melts of the preferred glass were made with $Sb_2O_3$ added and with differing amounts of uranium and oxidizing agents (including none) to determine the effect of having antimony in these glasses. The results of tests of these glasses with respect to the important property of ground state absorption loss at 1.06 microns are shown in Table II.

Table II

| Glass No. | Nominal Doping (Percent by Weight) | | | | Absorption Per Centimeter |
|---|---|---|---|---|---|
| | $Nd_2O_3$ | $UO_2^{+2}$ | $Sb_2O_3$ | $CeO_2$ | |
| 1 | 4 | 0.5 | 0 | 0.5 | 0.003 |
| 2 | 4 | 0.5 | 1 | 0 | 0.0187 |
| 3 | 4 | 0.5 | 1 | 0.5 | 0.0137 |
| 4 | 4 | 0.5 | 1 | 0 | 0.0187 |
| 5 | 4 | 1.0 | 1 | 0.5 | 0.0193 |
| 6 | 4 | 1.0 | 1 | 0 | 0.026 |
| 7 | 4 | 1.5 | 1 | 0.75 | 0.0252 |
| 8 | 4 | 1.5 | 1 | 0 | 0.057 |

From the results in Table II, is can be seen that apparently $Sb_2O_3$ interferes with the oxidation of $UO_2^{+2}$ to some extent, although significant reductions in ground state absorption of 25 percent to 50 percent are still obtained.

The ground state absorption at 1.06 microns in the laser glass is in part directly proportional to the uranium in the glass. There should be sufficient cerium present to oxidize the uranium in the glass to the $UO_2^{+2}$ state to as great an extent as possible. For example, in Example I the percentage of uranium present as $UO_2^{+2}$ was increased from about 63 percent to 91 percent when cerium was added. This reduced the ground state absorption by an order of magnitude. Larger amounts of cerium are required as larger amounts of uranium are employed in order to obtain maximum reduction in ground state absorption.

The amount of the essential ingredients can vary in percent by weight from 0 to 30 percent $Nd_2O_3$, 0.01 percent to 15 percent $UO_2^{+2}$ and 0.01 to 20 percent $CeO_2$ based upon the weight of the glass. When the invention is employed as an external Q-switching device, there need be no neodymium in the glass. When the invention is employed as an internal Q-switching device, the glass can contain 0.01 to 30 percent by weight of neodymium oxide.

Although the invention has been described with respect to two specific glasses as the best modes contemplated by the inventor for carrying out the invention, the practice of the invention is by no means limited to these particular glasses. When the host glass is a barium crown glass, the glass may contain 20 to 70 percent $SiO_2$, 5 to 30 percent BaO, 5 to 40 percent $K_2O$, 0 to 2 percent $Sb_2O_3$, as well as 0.01 to 15 percent $UO_2^{+2}$ and 0.01 to 20 percent $CeO_2$ as the essential ingredients. The host glass may alternatively be glasses such as lime-soda-silica glass, high silica borosilicate glass, flint glass and lead silicate glass.

The raw materials or glass batch materials which are used in making the above-identified glasses are, as has been indicated earlier in the specification, reagent grade ingredients, such as reagent grade sodium carbonate, sodium hydroxide, potassium carbonate, potassium hydroxide, calcium carbonate, calcium oxide, magnesium carbonate, magnesium oxide, aluminum oxide, aluminum carbonate, zinc oxide, zinc carbonate, barium oxide, barium carbonate, lead oxide, lead carbonate, boric acid, specially purified silica as described above, and meta-silicic acid.

The uranium salt which is used in the practice of the invention is selected from those uranium salts which under melting conditions employed in the invention will be converted to the $UO_2^{+2}$ valence state, that is, at least 91 percent of the uranium will be in the $UO_2^{+2}$ valence state in the final glass article. The uranium salt should not contain a reducing anion such as acetate or formate. Suitable uranium salts contain oxidizing anions and include uranyl nitrate and uranyl sulfate.

The term "glass" is intended to include in its broadest sense inorganic rigid materials which are of an amorphous nature having a non-periodic atomic structure as distinguished from materials having their atoms in an orderly periodic array.

Although the invention has been described with regard to specific details of certain preferred embodiments of the invention, it is not intended that such details be considered as limitations on the scope of the invention except insofar as included in the accompanying claims.

I claim:

1. A self Q-switching laser device including means for pumping $Nd^{+3}$ ions, comprising a glass article consisting essentially of:
   a. a conventional host glass selected from the group consisting of: soda-lime-alumina-silica glass, soda-lime-silica glass, high silica borosilicate glass, germanate glass, flint glass, and lead silicate glass;
   b. from 0.01 to 30 percent by weight $Nd_2O_3$ lasing element;
   c. from 0.01 to 15 percent by weight uranium expressed as $UO_2^{+2}$, at least 91 percent of the uranium content being in the $UO_2^{+2}$ valence form, and serving as the Q-switcher;
   d. from 0.01 to 20 percent by weight $CeO_2$ to maintain at least 91 percent of the uranium ions in the $UO_2^{+2}$ valence state.

* * * * *